(12) United States Patent
Widmer et al.

(10) Patent No.: US 6,387,176 B1
(45) Date of Patent: May 14, 2002

(54) MULTIPURPOSE CEMENT DISPERSING POLYMERS FOR HIGH FLOW AND HIGH STRENGTH CONCRETE

(75) Inventors: Jürg Widmer, Zürich; Ueli Sulser, Oberengstringen; Theodor A. Bürge, Geroldswil; Ulf Velten, Schweiz; Anna Krapf-Huber, Uitikon-Waldegg, all of (CH)

(73) Assignee: Sika AG, vorm. Kaspar Winkler & Co. (CH)

( * ) Notice: Subject to any disclaimer, the term of this patent is extended or adjusted under 35 U.S.C. 154(b) by 0 days.

(21) Appl. No.: 09/550,907

(22) Filed: Apr. 17, 2000

(30) Foreign Application Priority Data

Jun. 15, 1999 (EP) .......................................... 99 111 582

(51) Int. Cl.[7] .............................. C08F 8/00; C04B 24/26
(52) U.S. Cl. ..................... 106/808; 106/696; 106/708; 106/714; 106/719; 106/725; 106/727; 106/790; 106/823; 524/3; 525/418; 525/451; 525/535
(58) Field of Search ................................ 106/808, 696, 106/708, 714, 719, 725, 727, 790, 823; 525/418, 451, 535; 524/3

(56) References Cited

U.S. PATENT DOCUMENTS

| | | | | |
|---|---|---|---|---|
| 2,847,403 A | * | 8/1958 | Contois, Jr. ................. | 525/380 |
| 5,290,869 A | * | 3/1994 | Kinoshita et al. ............ | 525/291 |
| 5,393,343 A | | 2/1995 | Darwin et al. .............. | 106/808 |

FOREIGN PATENT DOCUMENTS

| | | | |
|---|---|---|---|
| DE | 4308773 | * | 1/1994 |
| EP | 448717 | * | 10/1991 |
| EP | 0 461 738 A | | 12/1991 |
| EP | 0 549 280 A | | 6/1993 |
| EP | 0 688 796 A | | 12/1995 |
| EP | 0 792 850 A | | 9/1997 |
| JP | 7-33496 | * | 2/1995 |

OTHER PUBLICATIONS

Derwent Publications Ltd., London, GB; AN 1995–110402, NP002123117 & JP 07 033496 A (Toho Chem Ind Co Ltd), Feb. 3, 1995.

Search Report issued Dec. 1, 1999 in corresponding European Patent Application No. 99111852.5-2111.

* cited by examiner

Primary Examiner—Anthony Green
(74) Attorney, Agent, or Firm—Burns, Doane, Swecker & Mathis, LLP

(57) ABSTRACT

A new category of multi-purpose polymers is presented, the polymers being capable to serve as a cement dispersing agent and which at the same time are set-accelerating and do have shrinkage reducing- and anticorrosive properties to steel. The polymers are ester and amide group-modified acrylic polymers, obtainable by a polymer analogous esterification of a polyacrylic acid with 1) a monofunctional polyalkyleneglycol-monoalkylether, 2) a tertiary alkanolamine and optionally 3) by amidation with a aminopolyalkylenglycol alkylether. The multi-purpose polymers serve for cement dispersing admixture for concrete with set accelerating, shrinkage compensating and anticorrosive properties to steel.

23 Claims, No Drawings

MULTIPURPOSE CEMENT DISPERSING POLYMERS FOR HIGH FLOW AND HIGH STRENGTH CONCRETE

CROSS REFERENCE TO RELATED APPLICATIONS

This application claims the priority of the European Patent Application No. 99 111 582.5 filed on Jun. 15, 1999, the disclosure of which is incorporated herein by reference in its entirety.

TECHNICAL FIELD

The present invention concerns a multipurpose cement dispersing polymer, in particular a modified acrylic polymer.

BACKGROUND OF THE INVENTION

Concrete from ready mix plants or mixed on job sites, used in civil engineering constructions, e.g. anchorage of big bridges, base plates or side walls and box culverts, in building structures such as heavy reinforced structures, concrete filling pipe structures or other complicated structures, requires to be fully compacted to achieve its desired strength and durability. The existing and conventional method for compaction is by vibration of the freshly placed concrete.

A new production system for in situ-casted concrete is needed to improve significantly the cost situation as well as the health and safety aspects on the construction site.

Additionally, self-compacting concrete leads to a higher productivity, shorter building times and to an improved labor environment.

Increased fluidity (known as "slump" and slump-flow) can be effected by using large dosages of water in the concrete, but it is well known that the resulting cement-based structure. exhibits insufficient compactness and will have poor final compressive strength.

In order to avoid excess amount of water, flowing concrete can be produced by the addition of so called super-plasticizers or high range water-reducing admixtures (HRWRs), like sulfonated melamine- or naphthalene-formaldehyde polycondensates or ligninsulfonate based admixtures. All of these well known polymers are not capable of causing the treated cement compositions to retain high flowability over a sustained period of time (known as "slump life") without imparting a significant delay in the initial set time and considerable retardation of early strengths.

An additional disadvantage is the inconstant and very low flow rate of freshly prepared concrete of containing high quantities (e.g. 500 to 700 kgs/m$^3$) of cement and up to 20% of silica fume and fly ash, which flow rate cannot be improved by the use of conventional HRWRs.

For heavy reinforced fresh precast concrete it is desired that the cementitious mixture has sufficient fluidity to flow through and around the reinforcement steel-structure to fill out the mold and level off at the top of the mold.

In the past ten years, various polymer-additives based on so-called polycarboxylic acid salts, e.g. copolymers of acrylic acid with acrylic esters of polyalkylene glycols have been proposed for imparting high water reduction, high flow and prolonged slump life to concrete, but most of them do not lead to self-compacting concrete without causing a too long retardation of the setting time and the early-strength development.

Enhancing early, i.e. 1 day, compressive strengths, is of high importance in the precast and prestressed concrete industry and chemical accelerators such as tertiary alkanolamines, alkali-and alkaline earthmetal thiocyanates, nitrites and halides are known in the art for this purpose and can be added separately to the fresh concrete.

Since calcium chloride and other inorganic salts can initiate corrosion of reinforcing steel embedded in hardened concrete, tertiary alkanolamines, which show both, accelerating and corrosion inhibiting properties are the most recommendable chemical accelerators.

Unfortunately, tertiary amines are well known to act as powerful catalysts for the cleavage of esters and from this reason can not be premixed with the acrylic ester polymers of the art and stored over longer periods, thus causing strongly reduced shelf life of the blend.

In order to improve the stability of such admixtures a deactivated form of alkanolamines was demanded which is reactivated in an alkaline environment.

With the introduction of a super high flow or self compacting concrete, which contains a multipurpose polymer simultaneously acting 1.) as a HRWR, 2) as set- and strength accelerator and 3) as corrosion inhibitor these problems could be solved, particularly the need for vibration can be significantly reduced.

SUMMARY OF THE INVENTION

The object of the present invention is to provide a new category of multi-purpose polymers being capable to serve as a cement dispersing agent and which at the same time are set-accelerating and do have shrinkage reducing- and anti-corrosive properties to steel. It was furthermore an objective to provide new cement dispersing, set-accelerating-, shrinkage reducing-, anti-corrosive admixtures for cement or mortar.

Said objectives are achieved by means of the modified acrylic polymers according to the main claim. Preferred embodiments are the object of dependent claims.

Surprisingly, it was found that the modified acrylic polymers according to the present invention do provide all the looked for properties, i.e. they could be employed as admixture for cement or mortar and could serve as a cement dispersing agent and at the same time are set-accelerating and do have shrinkage reducing- and anticorrosive properties to steel.

Said polymers according to the present invention are obtainable by reacting—in presence of a strongly acidic catalyst—1 mol of a poly(acrylic acid) A-1 or a $C_1$–$C_5$-ester thereof, having both a number average molecular weight of from 500 to 20,000

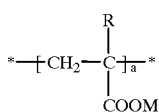

A-1 with 0.01–0.30 mol of a tertiary alkanolamine or a derivative thereof, represented by formula B-1

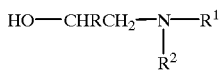

B-1 and, optionally with 0–0.80 mol of a monofunctional polyalkyleneglycol-monoalkylether, represented by formula D-1

D-1 and/or optionally with 0–0.60 mol of a α-amino-polyalkyleneglycol-ω-alkylether of formula E-1

E-1 wherein
- each R independently represents a hydrogen atom or a methylgroup;
- $R^1$ and $R^2$ independently represent a methyl group a hydroxyethyl($CH_2CH_2OH$) group, an acetoxyethyl ($CH_2CH_2OCOCH_3$) group, a hydroxy-isopropyl ($CH_2$—$CHOH$—$CH_3$) group, or an acetoxy-isopropyl ($CH_2$—$CHOCOCH_3$—$CH_3$) group;
- $R^3$ is a $C_1$–$C_4$-alkyl rest;
- M represents hydrogen, a $C_1$–$C_5$-alkyl rest or an alkali metal ion, an alkaline earth metal ion or an ammonium group or a mixture thereof;
- a is an integer of 5 to 270;
- x and y independently represent integers from 2–250.

The modified acrylic polymers according to the present invention having an improved cement dispersing, set accelerating, early strength enhancing properties with shrinkage-reducing- and corrosion-inhibiting activity to steel, are preferably composed of at least three constituent units selected from the group given by formulas A, B, D and E:

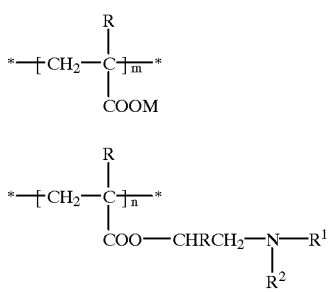

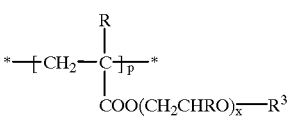

D

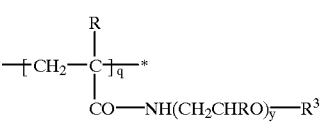

E wherein
- each R independently represents a hydrogen atom or a methyl group;
- $R^1$ and $R^2$ independently represent a methyl group, a hydroxyethyl($CH_2CH_2OH$) group, an acetoxyethyl ($CH_2CH_2OCOCH_3$) group, a hydroxy-isopropyl ($CH_2$—$CHOH$—$CH_3$) group, or an acetoxy-isopropyl ($CH_2$—$CHOCOCH_3$—$CH_3$) group;
- $R^3$ is a $C_1$–$C_4$ alkyl rest,
- M represents hydrogen, a $C_1$–$C_5$-alkyl rest or an alkali metal ion, an alkaline earth metal ion or an ammonium group or a mixture thereof;
- m, n, p and q are numerical values representing the molarity of the constituent units A, B, D, B being present in the polymer, in a proportion of m:n:p:q= (0.1–0.8):(0.01–0.3):(0–0.8):(0–0.6), such, that m+n+p+q=a and p+q≠0;
- x and y independently represent integers from 2–250.

The indices m, n, p and q indicate that respective numbers of monomer units are present in the polymer, whereby the monomer units are statistically distributed within the polymer.

The inventively found modified acrylic polymers are preferably obtained upon reacting the components A-1, B-1, D-1 and E-1 in presence of concentrated sulfuric acid as a catalyst and maintained at a temperature of about 140° to 180° C. for a period of from 2 to 8 hours.

In a preferred embodiment, the polyacrylic acid or its $C_1$–$C_4$ alkyl ester has a number average molecular weight of from 1,000 to 10,000. In another preferred embodiment, the reactant D-1 has a number average molecular weight of from 250 to 10,000, whereas the reactant E-1 has a number average molecular weight of from 250 to 10,000. The integers given for "a" approximately correspond to the molecular weight range of 500 to 20,000.

A preferred alkanolamine B-1 is a N,N-dialkyl alkanolamine, more preferably N,N-dialkyl alkanolamine is N,N-dimethylmonoethanol amine.

DETAILED DESCRIPTION OF THE INVENTION

The invention is based on extensive studies of modified acrylic polymers having
1) a poly(oxyalkylene) chain, and
2) a tertiary alkanolamine group,
which both are connected to the backbone of the polymer via ester bonds. In particular, the relationship between the molar ratio of the free carboxylate groups to the polyoxyethylene ester groups in the polymer as well as the length of the polyoxyethylene chain and the performance of the copolymer as a dispersing and waterreducing agent was investigated.

The accelerating and anticorrosive effect of tertiary alkanolamines in aqueous solutions is known for long time. The inventive polymers react in alkaline cementitious compositions and the alkanolamine group is released from the polymer, which is partially adsorbed onto the cement surface. Due, in particular, to their close proximity to the cement surface, the released alkanolamines display a high set-accelerating and shrinkage-reducing effect.

Moreover, it can be supposed that the polymers also are adsorbed onto the reinforcing steel bars within the fresh concrete, where they can act as corrosion inhibitors directly on the surface of said steel.

The preparation of the inventive modified acrylic polymers was carried out according to the synthetic route described in the below reaction scheme:

Reaction Scheme—Preferred Synthesis of the Inventive Polymers 1 mol of a polyacrylic acid of MW 2,000–10,000 is reacted at elevated temperature with p moles polyalkyleneglycol-monoalkylether, q moles of an alpha-amino-polyalkyleneglycol-ω-monoalkylether and n moles of a tertiary alkamolamine in presence of an acid catalyst:

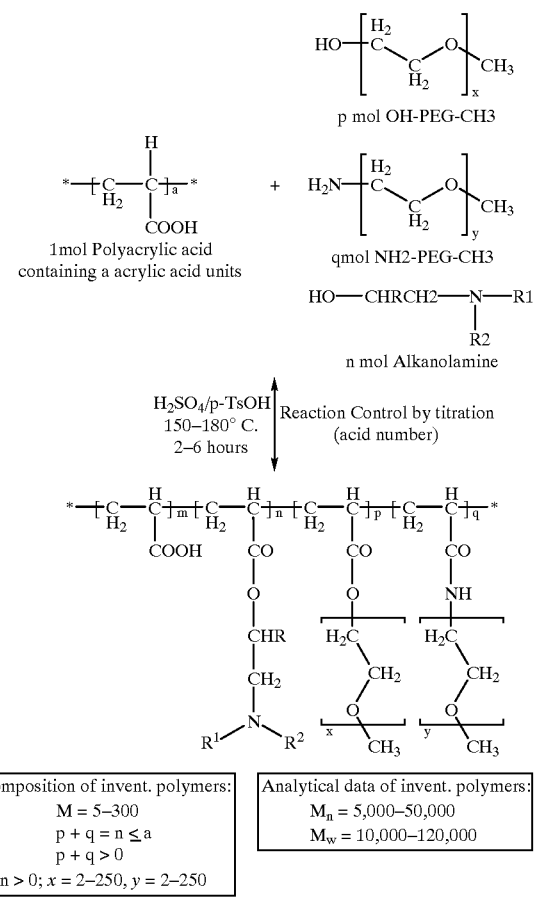

Following to a further aspect of the present invention the inventive polymers are employed for preparing a cement-dispersing, set-accelerating admixture having shrinkage-reducing- and anticorrosive properties to steel. Hence, further to the modified acrylic polymer according to the invention, said admixture preferably contains at least one defoaming or antifoaming agent and or at least one air-controlling agent.

Still a further aspect of the present invention is a mortar, concrete, cement or cementitious binder containing the modified acrylic polymer according to the present invention in an amount of 0.01 to 10% by weight of the binder, said mortar or concrete having a unit content of binder composed of cement or a mixture of cement and latent hydraulic or inert microscopic powder of 150 to 800 kg/m$^3$, preferably of 250 to 650 kg/m$^3$.

In a preferred embodiment, the cement is Portland cement, white cement, high alumina cement, and wherein the latent hydraulic or inert microscopic powder is fly ash, slag, natural pozzolane, silica fume, burnt oil shale, metakaolin or calcium carbonate.

The inventive admixture could be used in liquid form or as a powder form and could be added before, during or after the grinding operation of the cement or the cementitious binder.

A final aspect of the present invention is the use of a modified acrylic polymer according to the present invention as a cement dispersing agent, which is set-accelerating and has shrinkage reducing- and has anticorrosive properties to steel.

EXAMPLES

In the following, the inventive cement dispersing polymers, the method for producing the same and the cement containing composition of the present invention are explained more in detail with the following examples E1–E5 and comparative examples C1, C2, and C3. Moreover, for comparison purposes, commercially available polymers C-0, C4 and C5 are also used for the preparation and testing of flowing concrete (test example 1) and high-strength, self-compacting concrete of low water-to-cement ratio (test example 2)

In test examples 3 and 4, the corrosion inhibiting effect of the inventive polymers on mild steel and on reinforcing steel is demonstrated and compared to comparative examples.

Test example 5 shows the shrinkage reducing properties of the inventive polymers.

However, it must be noted that all these examples are given for illustrative purposes only and are not supposed to limit the invention, as defined by the claims, appended hereto.

Comparative Example C-0

SOKALAN PA 25 Cl PN (BASF, Badische Anilin & Sodafabrik) a 55% aq. solution of a partially neutralized polyacrylic acid of weight-average molecular weight 4000 was used as a dispersant for concrete.

Comparative Example C1

(Polymer C1)

160 g of an aqueous solution of a 4000 molecular weight polyacrylic acid was placed in a glass reactor fitted with a thermometer, stirrer, a gas inlet tube and a distillation assembly. The solution was heated to 70° C. and 100 g of a 1000 number average molecular weight polyethyleneglycol-monomethylether(MPEG1000) was added, followed by the careful dropwise addition of 7.5 g 50% -sulfuric acid.

The mixture was heated under a nitrogen atmosphere and kept at 165° C. to drive off water.

The rest of MPEG1000 (200 g) was then added and the temperature dropped to 130° C. After reheating the mixture was kept in a nitrogen atmosphere at 165° C. until the acid number remained at a constant value of 98.

Cooling of the mixture was then started and 0.4 g of an air detraining agent was added at 120° C. When the temperature had dropped to 90° C. 563 g of water was added.

The resulting solution was partially neutralized by the addition of 50%-sodium hydroxide to pH=4.5.

A 40%-solution of a polymer of a number average molecular weight of $M_n$=10,000 was obtained.

Example E1

(Polymer E1)

160 g of an aqueous solution of a 4000 molecular weight polyacrylic acid was placed in the reactor described above. The solution was heated to 70° C. and 150 g of MPEG1000 was added, followed by the careful, dropwise addition of 7.5 g 50%-sulphuric acid.

The mixture was heated under a blanket of flowing nitrogen and kept at 165° C. to drive off water for 1 hour.

The rest of the MPEG1000 (200 g) and 3.38 g (0.038 mol) of DMAE (dimethylamino-ethanol) were then added in the course of which the temperature dropped to 130° C.

After reheating of the mixture the temperature was kept at 165° C. until the acid number remained at a constant value of 93.

Cooling of the mixture was started and 0.4 g of an air detraining agent was added at 120° C. When the temperature had dropped to 90° C., 580 g of water was added.

The solution was adjusted to pH=4.5 by the slow addition of 50%-sodium hydroxide.

A polymer solution of 40% solids content and a number average molecular weight of $M_n$=9000 was obtained

Example E2

(Polymer E2)

160 g of an aqueous solution of a 4000 molecular weight polyacrylic acid was placed in the reactor described above. The solution was heated to 70° C. and 150 g of MPEG1000 was added, followed by the careful, dropwise addition of 7.5 g 50%-sulphuric acid.

The mixture was slowly heated to 165° C. for 1 hour under a blanket of flowing nitrogen to drive off water.

The rest of the MPEG1000 (200 g) and 13.5 g (0.152 mol) of DMAE) were then added in the course of which the temperature dropped to 130° C.

After reheating of the mixture the temperature was kept at 165° C., until the acid number remained at a constant value of 93 mg KOH/g.

Cooling of the mixture was started and 0.4 g of an air detraining agent was added at 120° C. When the temperature had dropped to 90° C., 580 g of water was added.

The solution was adjusted to pH=4.5 by the slow addition of 50%-sodium hydroxide A polymer solution of 40% solids content and a number average molecular weight of $M_n$=9200 was obtained.

Comparative Example C2

(Polymer C2)

160 g of an aqueous solution of a 4000 molecular weight polyacrylic acid was placed in the reactor described above The solution was heated to 70° C. and 300 g of a 1000 number average molecular weight α-amino-polyethyleneglycol-ω-methylether(amino-MPEG1000) was added, followed by the careful, dropwise addition of 7.5 g 50%-sulphuric acid.

The mixture was slowly heated to 130° C. over 2 hours while passing a stream of nitrogen through the reactor while water was taken overhead.

The mixture was the n heated and kept at 165° C. for about 2 hours until the acid number remained at a constant value of 88 mg KOH/g.

Cooling of the mixture was started and 0.4 g of an air detraining agent was added at 120° C. When the temperature had dropped to 90° C., 550 g of water was added.

The solution was adjusted to pH=4.5 by the slow addition of 50%-sodium hydroxide A polymer solution of 40% solids content and a number average molecular weight of $M_n$=10800 was obtained.

Example E3

(Polymer E3)

160 g of an aqueous solution of a 4000 molecular weight polyacrylic acid was placed in the reactor described above The solution was heated to 70° C. and 300 g of MPEG and 13.5 g DMAE were added, followed by the careful, dropwise addition of 7.5 g 50%-sulphuric acid.

The mixture was slowly heated to 130° C. over 2 hours while passing a stream of nitrogen through the reactor while water was taken overhead.

The mixture was then heated and kept at 165° C. for about 2 hours until the acid number remained at a constant value of 75 mg KOH/g.

Cooling of the mixture was started and 0.4 g of an air detraining agent was added at 120° C. When the temperature had dropped to 90° C., 580 g of water was added.

The solution was adjusted to pH=4.5 by the slow addition of 50%-sodium hydroxide A polymer solution of 40% solids content and a number average molecular weight of $M_n$=9800 was obtained.

Comparative Example C3

(Polymer C3)

160 g of an aqueous solution of a 4000 molecular weight polyacrylic acid was placed in the reactor described above. The solution was heated to 70° C. and 350 g of Pluriol A1000E and 60 g Sokalan A1000A were added, followed by the careful, dropwise addition of 7.5 g 50%-sulphuric acid.

The mixture was slowly heated to 130° C. over 2 hours while passing a stream of nitrogen through the reactor while water was taken overhead.

The mixture was then heated and kept at 165° C. for about 3 hours until the acid number remained at a constant value of 65 mg KOH/g.

Cooling of the mixture was started and 0.4 g of an air detraining agent was added at 120° C. When the temperature had dropped to 90° C., 600 g of water was added.

The solution was adjusted to pH=4.5 by the slow addition of 50%-sodium hydroxide A polymer solution of 40% solids content and a number average molecular weight of $M_n$=11500 was obtained.

Example E4

(Polymer E4)

160 g of an aqueous solution of a 4000 molecular weight polyacrylic acid was placed in the reactor described above. The solution was heated to 70° C. and 350 g MPEG 1000, 60 g amino-MPEG 1000 and 13.5 g DMAE were added, followed by the careful, dropwise addition of 7.5 g 50%-sulphuric acid.

The mixture was slowly heated to 130° C. over 2 hours while passing a stream of nitrogen through the reactor while water was taken overhead.

The mixture was then heated and kept at 165° C. for about 4 hours until the acid number remained at a constant value of 45.7 mg KOH/g.

Cooling of the mixture was started and 0.4 g of an air detraining agent was added at 120° C. When the temperature had dropped to 90° C., 605 g of water was added.

The solution was adjusted to pH=4.5 by the slow addition of 50%-sodium hydroxide A polymer solution of 40% solids content and a number average molecular weight of $M_n$=11100 was obtained.

Comparative Example C4

Melment-F10 (Süddeutsche Kalkstickstoffwerke, Trostberg), a commercial dispersing agent for hydraulic cement compositions, is the sodium salt of a sulfonated melamine-formaldehyde polycondensate of molecular weight of about 15,000.

Comparative Example C5

MIGHTY-150 (KAO Corp.,Tokyo), a commercial dispersing agent for hydraulic cement compositions, is the sodium salt of a sulfonated naphthalene-formaldehyde polycondensate of average molecular weight of about 5,000–6,000.

TABLE 1

Summarized preparation of the inventive polymer

| Example No | 45%-aq. Polyacrylic acid (MW = 4000) g (mol) | Tert. alkanolamine g (mol) | Polyethyleneglycol-monomethylether g (mol) | α-Amino-polyethylene-glycol-ω-methylether g (mol) | $H_2SO_4$ 50%-aq. solution g | Air detraining agent[3] g | Final acid number (mg KOH/g) | Polymer content of resulting aq.-Solution % |
|---|---|---|---|---|---|---|---|---|
| C1 | 160 | none | 300 (0.30) |  | 7.5 | 0.40 | 97.9 | 40 ± 1 |
| E1 | 160 | DMAE[1] 3.38 (0.038) | 300 (0.30) |  | 7.5 | 0.40 | 93.0 | 40 ± 1 |
| E2 | 160 | DMAE 13.5 (0.152) | 300 (0.30) |  | 7.5 | 0.40 | 71 | 40 ± 1 |
| C2 | 160 | none |  | 300 (0.30) | 7.5 | 0.4 | 88.5 | 40 ± 1 |
| E3 | 160 | DMAE 13.5 (0.152) |  | 300 (0.30) | 7.5 | 0.4 | 74.8 | 40 ± 1 |
| C3 | 160 | none | 350 (0.35) | 60 (0.06) | 7.5 | 0.4 | 64.8 | 40 ± 1 |
| E4 | 160 | DMAE 13.5 (0.152) | 350 (0.35) | 60 (0.06) | 7.5 | 0.4 | 45.7 | 40 ± 1 |
| E5 | 160 | DMAIP[2] 15.5 (0.152) | 350 (0.35) | 60 (0.06) | 7.5 | 0.4 | 45 | 40 ± 1 |

[1] Dimethylamino-ethanol
[2] Dimethylamino-isopropanol
[3] Commercial alkyl-polyoxyethylene-polyoxypropylene-copolymer

Example E5

(Polymer E5)

160 g of an aqueous solution of a 4000 molecular weight polyacrylic acid was placed in the reactor described above. The solution was heated to 70° C. and 350 g of MPEG 1000, 60 g Sokalan amino-MPEG1000 and 15.5 g DMAIP (Dimethylamino-isopropanol) were added, followed by the careful, dropwise addition of 7.5 g 50%-sulphuric acid.

The mixture was slowly heated to 130° C. over 2 hours while passing a stream of nitrogen through the reactor while water was taken overhead.

The mixture was then heated and kept at 165° C. until the acid number remained at a constant value of 45 mg KOH/g.

Cooling of the mixture was started and 0.4 g of an air detraining agent was added at 120° C. When the temperature had dropped to 90° C., 605 g of water was added.

The solution was adjusted to pH=4.5 by the slow addition of 50%-sodium hydroxide.

A polymer solution of 40% solids content and a number average molecular weight of $M_n$=10300 was obtained.

Non-acrylic comparative polymers:

Test-Examples

The following examples were conducted to demonstrate the improved fluidizing effects of the inventive polymers on fresh concrete and their accelerating action on the development of the early (1d) compressive strengths. The inventive polymers E1 to E5 were tested as fluidizers in flowing concrete (test-example 1) and as admixtures to improve the flowability and slump life of high-strength concrete of low water-to-binder ratio and high binder(cement+silica-fume) content (test example 2).

Said comparative polymers described above were also tested and compared in this context.

Test-Example 1

Flowing Concrete

Use of inventive polymers and comparative polymers for flowing concrete.

The consistency of freshly prepared concrete i.e. the mobility or viscosity, is the most important characteristic of workability. For measuring the consistency of concrete a "flow table spread" according to DIN 1048, part 1 is used in industry.

Sometimes the "slump test" according to ASTM C143 is additionally used.

For the purposes of this experiment, the flow table, spread was determined by placing concrete in an iron form on a two-part table (70×70 cm). By removing the form, a concrete body having a truncated cone shape is prepared. Then, the are of the table is lifted on one side for 4 cm, and allowed to fall. This procedure is carried out 15 times, and the concrete spreads. The average diameter of the formed cake corresponds to the flow table spread.

For the slump test, three layers of concrete are put into a mold having a shape of a truncated cone and having certain dimensions, and compacted with 25 pushes of an iron bar. At the top, the concrete is stripped-off evenly, then, the form is vertically removed. The concrete body will sink in by itself. The slump is measured by determining the vertical difference between the top of the mold and the displaced original center of the top surface of the test sample.

In order to compare the obtained test results and to bring them into a relation with the consistency, the freshly prepared concrete may be divided into consistency ranges:

TABLE 2

Consistency Ranges of Freshly Prepared Concrete

| Denotation | Flow Table Spread (cm) | Slump (cm) |
| --- | --- | --- |
| K1 = rigid | <30 | <1 |
| K2 = semi-plastic | 30 to 40 | 1 to 9 |
| K3 = plastic | 41 to 50 | 10 to 15 |
| K4 = flowing concr. | >50 | >15 |

Fluidizers are used when specific construction applications are necessary. Flowing concrete is used when high placing rates (e.g., from 50 to 150 m$^3$/hour) are required, or when the form and reinforcement of a construction part do not allow a compaction of the concrete by vibration.

Concrete's having K2 or K3 consistencies may be prepared from a concrete of K1 consistency by adding fluidizers (also designated as superplasticizers) when increased mechanical strength at an equal remaining workability shall be obtained.

For a freshly prepared concrete, the fluidizing effect is dependent on the dosage of the superplasticizer. Usually, from 0.2 to 1.5% solid matter quantities (in dissolved form), referred to the weight of cement, are added.

To a high degree, the effect is also dependent on the chemical structure and the molecular weight of the polymer, which forms the basis of the fluidizer.

In order to demonstrate the increased effectiveness of the inventive copolymers, the flow behavior of concrete mixtures containing the copolymers E1 to E5 was measured in accordance with DIN 1048, Part 1, and ASTM C143. As a comparison, the polymers C-0 to C5 were also tested.

TABLE 3

Composition of the fresh concrete mixtures

| Components: | Quantity in kg |
| --- | --- |
| Normal Portland Cement. Type1. (EU 197-1) | 7.5 |
| Netstal filler (lime stonefiller) | 1.5 |
| Rhine sand "Epple" up to 1.2 mm.* | 9.5 |
| Rhine sand "Epple" 1.2 to 4.0 mm.* | 8.0 |
| Rhine sand "Epple" 4.0 to 8.0 mm.* | 4.5 |
| Mine gravel 8 to 16 mm.* | 11.5 |
| Mine gravel 16 to 32 mm.* | 15.0 |
| Total Water; including mixing water and water of the copolymer solution | 3.45, |
| Inventive polymer(solid) or comparative polymer | 0.04, dissolved in the mixing water. |

*washed and dried

Preparation and Handling of the Concrete Specimen

The cement and the aggregates were premixed for 15 seconds in a 50 liter pan mixer for concrete. The mixing water, containing the fluidizer, was added slowly under stirring over 20 seconds. The batch was then mixed in a wet state for an additional 60 seconds. A part of the fresh concrete was then immediately filled into the mold for the determination of the flow table spread and the slump.

Immediately after measuring the flow table spread, 12 cm concrete cubes were prepared, and the compressive strength was measured after 1, 7 and 28 days in accordance with DIN 1048, Part 1. The determination of initial setting was carried out according to ASTM-C 403.

Additionally, the copolymers of the present invention were compared to the comparative polymers C-1 to C-3.

As mentioned above, the flow table spread and slump was measured immediately after mixing, and re-measured at 60 and 120 minutes after mixing. Remixing of the concrete for five seconds was carried out before each new measurement.

Concrete test mixtures No 1 to 11 which were prepared under the same conditions, were then subjected to the above-described examination of flow table spread and slump depending on the time.

The results are summarized in Table 4 showing a high water reduction and a surprisingly long lasting constancy of the flow table spread and the slump of up to 120 minutes in test mixtures nos. 3, 4, 6, 8 and 9 containing the copolymers according to the invention. From a comparison of these mixtures with comparative mixtures nos. 1, 2, 7, 10 and 11 containing the alkanolamine-free polymers and a sulphonated melamine-formaldehyde condensate and sulphonated naphthalene-formaldehyde condensate, it can be seen, that the comparative test mixtures show a strong retardation of the early strength development. Also, comparative mixtures no 1, 10 and 11 indicate a considerable stiffening tendency already 60 minutes after mixing.

TABLE 4

Time-dependent flow behavior and compressive strengths of flowing concrete of water-to-cement ratio W/C = 0.46 using inventive and comparative polymers as fluidizers.

| Test-Mixture No | Polymer example | Dosage in % of cement weight | Flow table spread/ slump in cm, x minutes after mixing | | | Compressive strength in Newton/mm² y days after mixing | | | %-Air content after mix |
|---|---|---|---|---|---|---|---|---|---|
| | | | x = 0 | 60 | 120 | y = 1 | 7 | 28 | |
| 1 | C0 | — | 31/0 | — | — | — | 22.4 | 45 | 2.8 |
| 2 | C1 | 0.3 | 51/22 | 53/20 | 50/17 | 13.0 | 43.8 | 47.7 | 1.9 |
| 3 | E1 | 0.3 | 52/19 | 53/20 | 50/18 | 20.4 | 43.3 | 48.5 | 2.0 |
| 4 | E2 | 0.3 | 50/18 | 52/19 | 50/19 | 23.2 | 44.3 | 46.0 | 1.8 |
| 5 | C2 | 0.3 | 56/21 | 54/22 | 54/20 | 10.5 | 39.7 | 48.0 | 1.9 |
| 6 | E3 | 0.3 | 55/20 | 54/21 | 52/19 | 20.4 | 42.3 | 50.2 | 1.6 |
| 7 | C3 | 0.3 | 58/20 | 69/25 | 57/22 | 14.9 | 39.0 | 47.1 | 1.8 |
| 8 | E4 | 0.3 | 60/22 | 61/22 | 55/20 | 26.5 | 42.0 | 49.8 | 1.8 |
| 9 | E5 | 0.3 | 58/22 | 55/19 | 55/18 | 26.3 | 44.5 | 50.2 | 1.7 |
| 10 | C4 | 0.3 | 43/12 | — | — | 26.9 | 43.1 | 51.9 | 1.5 |
| 11 | C5 | 0.3 | 48/14 | 34/2 | — | 21.0 | 43.5 | 50.0 | 1.9 |

The measurement of flowing properties of fresh mixtures of high flowing -high strength concrete of very low water-to-cement ratio(W/C) is described in the next test-example.

Test-Example 2

High flowing-high Strength Concrete.

High flowing-high strength concrete of very low water-to-binder ratio and very high content of binder(cement+ silicafume) is increasingly demanded by the building- and construction industry. Preparation and testing are prescribed in Japanese Industrial Standards (JIS-A).

Preparation of the concrete mixtures

In a mixing ratio as shown in table 5, ordinary Portland cement, silica fume, fine aggregates and coarse aggregates (gravel) were sequentially placed inside a forced mixing-type mixer of 50 liters volume. The cement and the aggregates were premixed for 15 seconds, and then the mixing water, containing the fluidizer and 0.02% (related to the weight of fluidizer) of a synthetic air detrainer, was added slowly under stirring over 20 seconds. The batch was then mixed in a wet state for 3 minutes. After mixing, the mixture was transferred to a mixing boat and retempering was conducted at a predetermined number of times every 60 minutes and the slumpflow and slump with the progression of time was 30 measured for up to 120 minutes according to JIS-A 1101. The procedures specified in JIS-A 1123 and JIS-A 6204 were employed to measure air content and time-dependent compressive strengths.

TABLE 5

Concrete Mix Proportion for Self Compacting Concrete

| W/B | S/A | Polymer-Dosage | UNIT CONTENT (kg/m³) | | | | |
|---|---|---|---|---|---|---|---|
| | | | W | C | SF | S | G |
| 22% | 39% | 1.6% | 165 | 675 | 75 | 600 | 950 |

Raw materials:
W = Mixing water, including water of the added fluidizer.
C = Cement: Normal Portland Type 1
SF = Undensified Silicafume: density: 2.2–2.7,
surface: 100.000–250.000 cm²/g
S = Sand Epple: 0–1.2 mm, 300 kg
1.2–4 mm, 300 kg
G = Gravel Epple: 4–8 mm, 280 kg
8–16 mm 670 kg
A = Aggregate: Sand + Gravel
B = Cement + Silicafume Polymer-dosage: dosage (weight %) of solid polymer, contained in the in the admixture, in relation to the cement weight.

Results of the evaluation oft he mixtures, containing inventive and comparative polymers, are shown in table 6.

TABLE 6

Time-dependent flow behavior and compressive strengths of flowing concrete of water-to-cement ratio W/C = 0.22, using inventive and comparative polymers as fluidizers.

| Test-Mixture No | Polymer designation | Polymer dosage in % (solid) | Slump-flow in cm x minutes after mixing | | | Compressive strength in Newton/mm² y days after mixing | | % Air content after mixing |
|---|---|---|---|---|---|---|---|---|
| | | | x = 0 | 60 | 120 | y = 1 | 28 | |
| 1 | C0 | — | <35 | — | — | — | 63.9 | 8.4 |
| 2 | C1 | 1.6 | 51 | 58 | 60 | 12.7 | 98.9 | 2.1 |
| 3 | C1-A | 1.6 | 42 | 39 | — | 17.7 | 102.0 | 2.4 |
| 4 | E1 | 1.6 | 50 | 52 | 60 | 23.0 | 101.0 | 2.0 |
| 5 | E2 | 1.6 | 58 | 61 | 59 | 29.1 | 100.0 | 2.0 |
| 6 | C2 | 1.6 | 64 | 63 | 61 | 8.8 | 103.4 | 1.9 |
| 7 | E3 | 1.6 | 61 | 60 | 59 | 22.6 | 105.0 | 1.8 |
| 8 | C3 | 1.6 | 60 | 64 | 62 | 14.6 | 102.0 | 2.1 |
| 9 | E4 | 1.6 | 59 | 63 | 60 | 24.7 | 102.5 | 2.2 |
| 10 | E5 | 1.6 | 57 | 61 | 59 | 23.9 | 104.3 | 2.3 |

TABLE 6-continued

Time-dependent flow behavior and compressive strengths of flowing concrete of water-to-cement ratio W/C = 0.22, using inventive and comparative polymers as fluidizers.

| Test-Mixture No | Polymer designation | Polymer dosage in % (solid) | Slump-flow in cm x minutes after mixing | | | Compressive strength in Newton/mm² y days after mixing | | % Air content after mixing |
|---|---|---|---|---|---|---|---|---|
| | | | x = 0 | 60 | 120 | y = 1 | 28 | |
| 11 | C4 | 1.6 | 43 | — | — | 31.1 | 102.4 | 1.8 |
| 12 | C5 | 1.6 | 48 | | | 15.3 | 93.2 | 3.8 |

It is evident from table 6 that the testmixtures 4, 5, 7, 9 and 10, containing the inventive alkanolamine-modified polymers, show an improved setting behaviour and early-strength development as compared to comparative mixtures 1,2,6 and 8 which exhibit strong retardation of initial setting and early strengths whereas mixtures 11 an 12 which contain conventional superplasticizers show only poor flowability. On the other hand the comparative mixture No.3, being a blend of E2 with 0.35% N,N-Dimethylamino-ethanol, demonstrates the detrimental influence of free alkanolamines even in low concentrations on water reduction (x=0) and time-dependent slump flow (x=60 and 120 minutes). In addition to these findings, test mixture 4 shows a higher early strength than testmixture 3, although both mixtures contain the same, very low content of alkanolamine.

Test-Example 3

Corrosion Inhibitor of mild steel

The anti-corrosive activity of the polymers was tested by the stacked steel test, as is known.

An aqueous solution containing 1.6% by weight of the polymers and having a water hardness of 177 ppm of calcium was prepared for use in the test.

Mild steel cylinders of 3.3–4.5 cm length and 2.5 cm in diameter were used as the test material. All surfaces, except one end, were coated with an epoxy coating.

The exposed test end of each slug was polished with a power grinding wheel, then was covered with about 1 g of the 1.6%-polymer solution. The exposed end of the second steel slug was placed over the test end to spread the film and prevent evaporation. The stacked steel slugs were then placed in an equilibrated desiccator over water. Tests were carried out at 20° C.

Tap water of 177 ppm hardness was used as a control in each test.

The test results (table 7) showed, that solutions containing the inventive polymers even at low concentrations were non corrosive whereas none of the comparative polymers did develop a anticorrosive activity.

TABLE 7

Time-dependent corrosion of mild steel in water; Inhibition by inventive polymers

| Test No. | Polymer designation | Concentration of the aq. polymer solution | Period of examination [days] | Condition of steel after test |
|---|---|---|---|---|
| 1 | control | — | 1 d | K |
| 2 | Control | — | 7 d | K-st |
| 3 | C0 | 1.6% | 1 d | K-st |
| 4 | C1 | 1.6% | 1 d | K |
| 5 | E1 | 1,6% | 1 d | Inh |
| 6 | E2 | 1.6% | 7 d | Inh |
| 7 | C2 | 1.6% | 1 d | Inh |
| 8 | C2 | 1.6% | 7 d | K |
| 9 | E3 | 1.6% | 7 d | Inh |
| 10 | C3 | 1.6% | 1 d | K |
| 11 | C3 | 1.6% | 7 d | K-st |
| 12 | E4 | 1.6% | 7 d | Inh |
| 13 | E4 | 1.6% | 28 d | Inh |
| 14 | E5 | 1.6% | 7 d | Inh |

K: Distinct traces of corrosion visible on the steel
K-st: Strong corrosion visible
Inh: No corrosion visible Test-Example 4

Measurement of the anticorrosive effect of inventive polymers on mild steel in CaCl-solutions In this example, the influence of the inventive, alkanolamine-modified corrosion inhibiting polymers comparison to non modified polymers C1, C2 and C3 on mild steel specimens was investigated.

The examination was carried out by means of potentiodynamic polarization measurements, performed in aqueous, chloride containing solutions using a potentiostat/galvanostat with scan option and a Camec II station.

Test Conditions
$U_{max} \pm 5V$, $v_u = 1$–8350 mV/min
working electrodes: polished steel plates (mild steel ST37)
$v = 10$ mV/s
concentration of inventive and comparative polymers: 1.60% based on solids The test solution was neither stirred, nor degassed. The electrode was conditioned for one hour at; i=0.0 mA/cm², then polarization was started.

Test period: 1 hour; $i_{max} = 0.5$ mA/m' $j_0$ and $j_u$ depending on currents ($i_{max} = 30$–50 mA).

After a further conditioning at i=0.50 mA/cm² for 30 minutes, the cyclic voltammetry was performed in cathodic direction during 30 minutes.

As can be seen from the data in table 8, all inventive polymers perform substantially better than the comparative polymers as well as the control, showing higher positive values of both, the pitting- and the repassivation potentials.

TABLE 8

Cyclic voltammetry at mild steel electrode in saturated Ca(OH)₂ + 0.09 M-Na(OH)

| Test No. | Polymer designation | Concentration of polymer in test solution [%] | Pitting potential vs SCE Ø 3 scans [mV] | Repassivation potential vs SCE Ø 3 scans [mV] |
|---|---|---|---|---|
| 1 | Control | — | +275 | −520 |
| 2 | C1 (comparative) | 1.6 | +245 | −580 |
| 3 | E1 | 1.6 | +450 | −470 |
| 4 | E2 | 1.6 | +995 | +710 |
| 5 | C2 (comparative) | 1.6 | +560 | −430 |
| 6 | E3 | 1.6 | +1180 | +980 |
| 7 | C3 (comparative) | 1.6 | +690 | −400 |
| 8 | E4 | 1.6 | +1050 | +870 |
| 9 | E5 | 1.6 | +1000 | +720 |

Test-Example 5

In the following, the influence of inventive tert-alkanolamines containing polymers on the shrinkage behavior of a mortar of high cement content is demonstrated by measurement of the length change of 4×4×16 cm³ prisms fitted with an inserted neck.

Composition of the Fresh Mortar

| | |
|---|---|
| Portland cement type CEM I 42.5 | 0.750 kg |
| Sand 0–8 mm | 3.150 kg |
| Water | 0.350 kg |
| Inventive or comparative polymer | 0.012 kg |

The test specimen were initially stored for 24 hours at 20° C. and 95% RH and, subsequently, at 23° C. and 50% RH.

TABLE 9

Effect of inventive, shrinkage compensating (E) and comparative (C) polymers on the shrinkage of mortar prisms.

| Test No. | Polymer Designation | Dosage of solid polymer, calculated on Cement [%] | Shrinkage after 28 d [%] |
|---|---|---|---|
| 1 | Control | — | −0.055 |
| 2 | C1 | 1.6 | −0.048 |
| 3 | E1 | 1.6 | −0.033 |
| 4 | E2 | 1.6 | −0.028 |
| 5 | C2 | 1.6 | −0.045 |
| 6 | E3 | 1.6 | −0.027 |
| 7 | C3 | 1.6 | −0.044 |
| 8 | E4 | 1.6 | −0.022 |
| 9 | E5 | 1.6 | −0.025 |

This example clearly demonstrates the shrinkage compensating effect of up to 50% of the inventive polymers on mortar pieces whereas comparative polymers show only poor reduction as compared to the control specimen.

While there are shown and described presently preferred embodiments of the invention, it is to be distinctly understood that the invention is not limited thereto but may be otherwise variously embodied and practiced within the scope of the following claims.

What is claimed is:

1. A modified acrylic polymer prepared by reacting, in the presence of sulfuric acid or p-toluene sulfonic acid, 1 mol of a poly(acrylic acid) A-1 or a C₁–C₅-ester thereof, having a number average molecular weight of from 500 to 20,000,

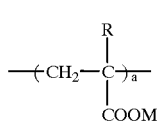

A-1 with 0.01–0.30 mol of a tertiary alkanolamine or a derivative thereof, represented by formula B-1,

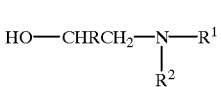

B-1 and, optionally, with 0–0.80 mol of a monofunctional polyalkyleneglycol-monoalkylether, represented by formula D-1,

D-1 and/or optionally with 0–0.60 mol of an α-amino-polyalkyleneglycol-ω-alkylether of formula E-1,

E-1 wherein each R independently represents a hydrogen atom or a methyl group; $R^1$ and $R^2$ independently represent a methyl group, a hydroxyethyl ($CH_2CH_2OH$) group, an acetoxyethyl ($CH_2CH_2OCOCH_3$) group, a hydroxy-isopropyl ($CH_2$—$CHOH$—$CH_3$) group, or an acetoxy-isopropyl ($CH_2$—$CHOCOCH_3$—$CH_3$) group; $R^3$ is a $C_1$–$C_4$-alkyl group, M represents hydrogen, a $C_1$–$C_5$-alkyl group or an alkali metal ion, an alkaline earth metal ion or an ammonium group or a mixture thereof; a is an integer of 5 to 270; x and y independently represent integers from 2–250, and wherein the monofunctional polyalkyleneglycol-monoalkylether of formula D-1, and/or the α-amino-polyalkyleneglycol-ω-alkylether of formula E-1 is present during the reaction.

2. A modified acrylic polymer according to claim 1, wherein the reactants A-1, B-1, D-1 and E-1 are reacted in presence of concentrated sulfuric acid as a catalyst and maintained at a temperature of about 140° to 180° C. for a period of from 2 to 8 hours.

3. A modified acrylic polymer according to claim 1, wherein the polyacrylic acid or the $C_1$–$C_4$ alkyl ester thereof has a number average molecular weight of from 1,000 to 10,000.

4. A modified acrylic polymer according to claim 1, wherein the reactant D-1 has a number average molecular weight of from 250 to 10,000.

5. A modified acrylic polymer according to claim 1, wherein the reactant E-1 has a number average molecular weight of from 250 to 10,000.

6. A modified acrylic polymer according to claim 1, wherein the alkanolamine represented by formula B-1 is a N,N-dialkyl alkanolamine.

7. A modified acrylic polymer according to claim 6, wherein the N,N-dialkyl alkanolamine is N,N-dimethylmonoethanol amine.

8. A modified acrylic polymer according to claim 1, wherein 0.06–0.6 mol of the α-amino-polyalkyleneglycol-ω-alkylether of formula E-1 is present during the reaction.

9. A cement dispersing, set-accelerating admixture having shrinkage reducing- and anticorrosive properties to steel, said admixture comprising a modified acrylic polymer according to claim 1.

10. An admixture according to claim 9, that comprises at least one defoaming or antifoaming agent.

11. An admixture according to claim 9, comprising at least one air controlling agent.

12. A cement or cementitious binder comprising a modified acrylic polymer according to claim 1 in an amount of 0.01 to 10% by weight of the binder.

13. A mortar or concrete comprising the binder of claim 12, said mortar or concrete having a unit content of binder comprised of cement or a mixture of cement and latent hydraulic or inert microscopic powder of 150 to 800 kg/m³.

14. A mortar or concrete according to claim 13, wherein the cement is Portland cement, white cement, high alumina cement, and wherein the latent hydraulic or inert microscopic powder is fly ash, slag, natural pozzolane, silica fume, burnt oil shale, metakaolin or calcium carbonate.

15. A method for producing a cement or cementitious binder according to claim 12, wherein the admixture comprising the modified acrylic polymer is in liquid or powder form and is added before, during or after a grinding operation of the cement or the cementitious binder.

16. A modified acrylic polymer comprising at least three constituent units selected from the group A, B, D and E as follows:

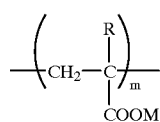

A

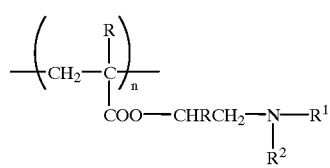

B

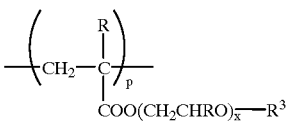

D

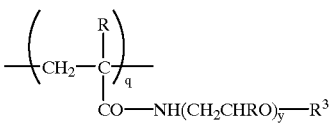

E wherein each R independently represents a hydrogen atom or a methylo group; $R^1$ and $R^2$ independently represent a methyl group, a hydroxyethyl($CH_2CH_2OH$) group, an acetoxyethyl($CH_2CH_2OCOCH_3$) group, a hydroxy-isopropyl($CH_2$—$CHOH$—$CH_3$) group, or an acetoxy-isopropyl($CH_2$—$CHOCOCH_3$—$CH_3$) group; $R^3$ is a $C_1$–$C_4$-alkyl group; M represents hydrogen, a $C_1$–$C_5$-alkyl group or an alkali metal ion, an alkaline earth metal ion or an ammonium group or a mixture thereof; m, n, p and q are numerical values representing the molarity of the constituent units A, B, D, E present in the polymer, in a proportion of m:n:p:q=(0.1–0.8):(0.01–0.3):(0–0.8):(0–0.6), such that m+n+p+q=a and p+q≠0; and x and y independently represent integers from 2–250.

17. A cement dispersing, set-accelerating admixture having shrinkage reducing- and anticorrosive properties to steel, said admixture comprising a modified acrylic polymer according to claim 16.

18. An admixture according to claim 17, that comprises at least one defoaming or antifoaming agent.

19. An admixture according to claim 17, comprising at least one air controlling agent.

20. A cement or cementitious binder comprising a modified acrylic polymer according to claim 16 in an amount of 0.01 to 10% by weight of the binder.

21. A mortar or concrete comprising the binder of claim 20, said mortar or concrete having a unit content of binder comprised of cement or a mixture of cement and latent hydraulic or inert microscopic powder of 150 to 800 kg/m³.

22. A mortar or concrete according to claim 21, wherein the cement is Portland cement, white cement, high alumina cement, and wherein the latent hydraulic or inert microscopic powder is fly ash, slag, natural pozzolane, silica fame, burnt oil shale, metakaolin or calcium carbonate.

23. A method for producing a cement or cementitious binder according to claim 20, wherein the admixture comprising the modified acrylic polymer is in liquid or powder form and is added before, during or after a grinding operation of the cement or the cementitious binder.

* * * * *